D. R. PRINDLE.
Corn-Planter.

No. 23,391. Patented Mar. 29, 1859.

Witnesses:
A. B. Stoughton
Tho. H. Uppeman

Inventor:
Daniel R. Prindle

UNITED STATES PATENT OFFICE.

DANIEL R. PRINDLE, OF BETHANY, NEW YORK.

IMPROVEMENT IN SEED-PLANTERS.

Specification forming part of Letters Patent No. 23,391, dated March 29, 1859.

*To all whom it may concern:*

Be it known that I, DANIEL R. PRINDLE, of Bethany, in the county of Genesee and State of New York, have invented certain new and useful Improvements in Seed-Planting Machines; and I do hereby declare the following to be a full, clear, and exact description of the construction and operation of the same, reference being had to the accompanying drawings, making a part of this specification, in which—

Figure 1:
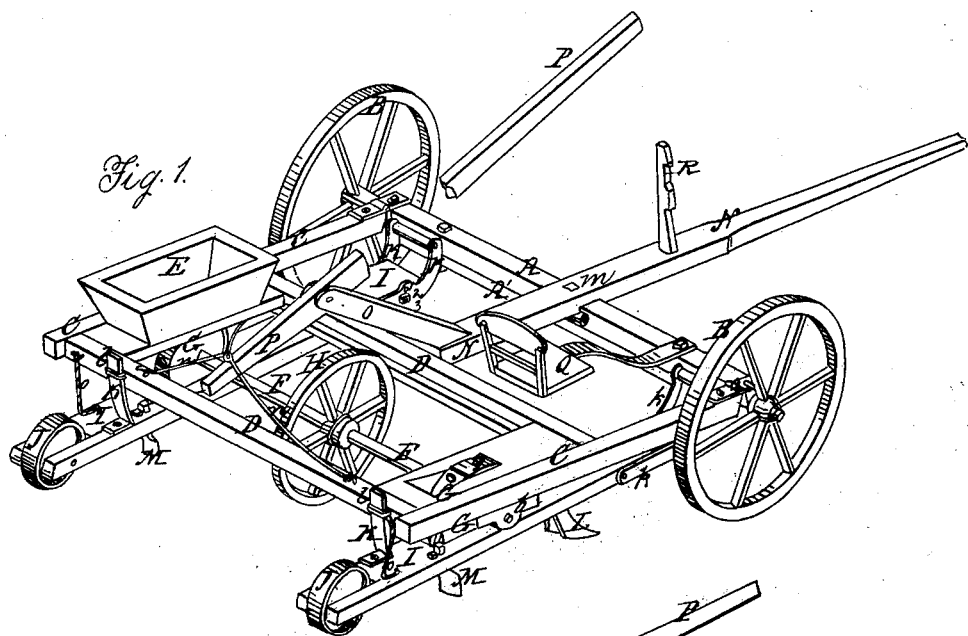
Figure 2:
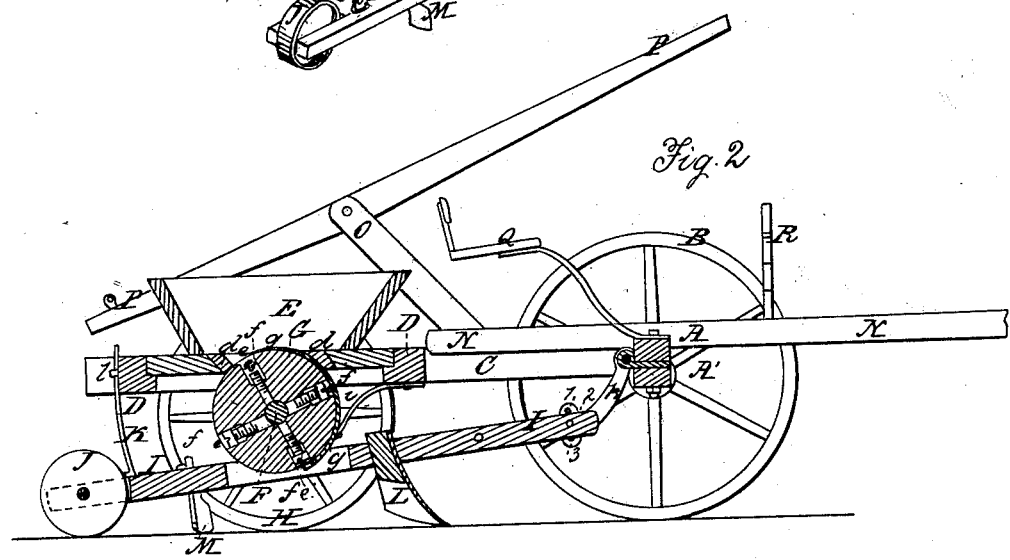
Figure 3:
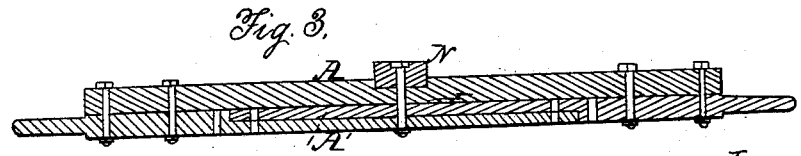

Figure 1 represents a perspective view of the machine. Fig. 2 represents a longitudinal vertical section through the machine; and Fig. 3 represents a longitudinal vertical section through the axle on which the main supporting-wheels are placed, showing its adjustability.

Similar letters of reference, where they occur in the separate figures, denote like parts in all the figures.

My invention relates to a machine for planting seeds of any kind in rows, on which the operator may ride, and which is so constructed as that the planting devices may be adjusted on the main frame and the shocks or motions imparted to either the seeding or main frame shall not be necessarily communicated to the other frame, while at the same time the two frames are so united as that they may be both raised up by one and the same lever, as will be hereinafter more particularly set forth and explained.

To enable others skilled in the art to make and use my invention, I will proceed to describe the same with reference to the drawings.

My machine is designed for planting corn, beans, turnip, or any other seed that is usually planted in drills or rows.

A represents an axle supported at its ends in bearing-wheels B B. To this axle, at the points $a\ a$, are hinged two longitudinal pieces, C C, extending rearward, and which pieces are connected by cross-pieces D D, the whole forming an independent frame hinged to the axle, or rather to the bolster or beam on top of the axle proper, for the axle is composed of two pieces, as will be hereinafter described. Upon the frame thus hinged to the axle are mounted the seed-hoppers E, (one only being shown; but the frame is arranged for two, and is capable of receiving three hoppers, and may be arranged for more, if necessary.)

F is an axle supported by its journals in suitable bearings, $b$, on this hinged frame, said axle being arranged under the line of the hoppers, and carrying a series of seeding-wheels, G, one for each hopper. At or near the center of the axle F there is a supporting and driving wheel, H, which can be moved along on the axle to any proper position, and there fastened by a set-screw, $c$, or otherwise, so that the weight of the rear portion of the hinged frame shall be supported by said wheel H and the wheel shall give motion to the axle F and through it to the seeding wheels or cylinders G upon it. The bottoms $d$ of these hoppers I make of or line with metal, inasmuch as they are beveled or cut under, or both, to admit of the rotation of the seeding-wheel underneath and through their bottom portions, and to allow the cells $e$ in said wheels or cylinders to fill as low down and as far rearward of the hopper as possible, which makes the operation of filling or charging the seed-cells much more certain. These seeding wheels or cylinders are bored into on their perimeter to form a screw-hole, into which set-screws $f$ are fitted, said holes being countersunk to receive the heads of said screws, and by means of these screws any desirable depth or capacity may be given to the seed-cells $e$; or they may be closed entirely, as the nature of the planting may require.

About one-half of the perimeter of each seeding-wheel—viz., that half which for the time being is conveying the charge or charges of grain or seeds from the hopper to the place where it is dropped onto the ground or into the furrow previously prepared for it—is covered by a curved spring-plate, $g$, which plate is controlled by a second spring, $i$, connected to the frame and bearing against or connected with the aforesaid spring-plate $g$. The object of this spring-plate and spring is quadruple: First, it sweeps back or keeps back the excess of grain or seed over and above the regular charge; second, it holds the seeds that are in charge while said cells pass from the hopper to the place of delivery; third, it yields to any seed or hard substance that may protrude from the cells, but without jamming them tight in the cells; and, fourth, it allows the seeds to drop from the cells when they arrive at the proper planting-point.

The axle, as heretofore stated, is composed of two horizontal sections—viz., an upper one, A, which may be of wood, and an under one, A', which may be of iron. The under section, A', is made in two parts, halved and lapped together, as seen in Fig. 3, for the purpose of widening the space between the wheels, or, in other words, of lengthening the axle, when the mark of the wheel or wheels is desired for guiding the machine on its next round to keep the drills or rows straight. By making suitable bolt or adjusting holes or slots through the half-lap and the component parts of the the axle this widening or narrowing of the path of the wheels can be readily effected.

It will be remembered that the pieces C of the hinged frame are connected to the part A of the axle, and this part of the axle is never lengthened or shortened, and hence the space between the outside pieces, C, never varies; but the hoppers E may be moved toward or from each other on said frame, and their seed-wheels correspondingly moved on their shaft F, to vary the distance between the hills, rows, or furrows that are to be planted, there being suitable provision made for such movements and for firmly holding the parts in place when so moved.

To the upper section, A, of the axle are hinged or pivoted the upper ends of the adjustable clevis-irons $k$ $k$, the other ends of which clevis-irons are respectively connected to a beam or plank, I, which extends rearward underneath the hinged frame, and the extreme rear ends of these beams or planks I are furnished with wheels J, which run upon the ground. There are mortises or openings made through these beams for the seeding wheels or cylinders to pass through, and to allow the beams to rise when its wheel passes over any protuberance without raising up the wheels or hinged frame to which they are connected.

K are guides on the beams I. They pass up through staples $l$ on the cross-piece D to keep them (the beams) in proper position as they rise and fall.

The clevis-irons $k$ are furnished with a series of adjusting-holes, 1 2 3, through which and through a hole in the front of the beams I a bolt may be passed to raise or lower said front ends. These beams I are furnished with a share or tooth, L, for opening out a furrow in advance of the line of each seeding-wheel, into which the grain or seeds are dropped at regular intervals or spaces, so as to leave them in hills, and behind the seeding-wheels, on these beams, are shoes M for covering up the dropped seed. Instead of these beams being each separately pivoted to the axle, one rod may serve as the pivot or hinge for all of them, and they can thus be readily moved along to conform to the position of the seeding-wheel with which they act in concert. The object in raising or lowering the front ends of the beams is to raise or lower the furrow-opener, so as to plant shallower or deeper, as may be desired.

When a third seeding apparatus is applied to the central portion of the machine, then the wheel H is moved far enough along on its axle to admit of its being added.

The tongue N is rigidly connected at $m$ to the axle, and extends some distance in rear of it, and on its extreme rear end there is a brace or upright, O, in the top of which is pivoted or hung a lever, P, the rear end of said lever holding up, by means of the chains $n$, or their equivalents, the rear end of the hinged frame, when it is desirable to so hold it up. The beams I are also at their rear ends connected by chains $o$, or otherwise, to the hinged frame, so that the driver in his seat Q may, by means of the lever P, raise up and hold or let down both the hinged frame and the beams, and when they are held up and the lever put under the catch R on the tongue the seeding devices are thrown out of gear and the machine may be turned around or moved from place to place, resting solely on the wheels B B. The seeding devices may be raised up, by an attendant walking behind the machine, by the same lever, as it extends far enough in rear for that purpose.

I have represented the axle as made of two sections—one of wood and the other of iron; but it may be made of wood alone, and in two sections, without changing its characteristics in the least, and will probably be so made.

Having thus fully described the nature and object of my invention, what I claim therein as new, and desire to secure by Letters Patent, is—

1. Hinging the frame that carries the seeding devices, and the beams that carry the furrow opener and coverer, to the axle, substantially as and for the purpose set forth.

2. In combination with the axle and hinged frame and beams, the tongue and lever for raising, lowering, or controlling the planting and covering devices, substantially as described.

3. The adjustable hinged clevis-irons, made, arranged, and operating as herein set forth.

4. The combination of the curved spring-plates $g$ and springs $i$, as applied to the seeding wheels or cylinders, for the purpose explained.

DANIEL R. PRINDLE.

Witnesses:
A. B. STOUGHTON,
THOS. H. UPPERMAN.